United States Patent
Yano et al.

(10) Patent No.: US 6,807,235 B2
(45) Date of Patent: Oct. 19, 2004

(54) WIRELESS COMMUNICATION APPARATUS PROCESSING INTERMITTENT DATA

(75) Inventors: Takashi Yano, Tokorozawa (JP); May Suzuki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 694 days.

(21) Appl. No.: 09/795,110

(22) Filed: Mar. 1, 2001

(65) Prior Publication Data

US 2002/0111199 A1 Aug. 15, 2002

(30) Foreign Application Priority Data

Feb. 9, 2001 (JP) ........................................ 2001-033392

(51) Int. Cl.⁷ .............................................. H04J 13/02
(52) U.S. Cl. ...................... 375/259; 370/311; 455/522
(58) Field of Search ................................ 375/259, 377; 370/311, 328, 337, 347, 349; 340/3.1, 3.21; 455/522, 574; 713/322

(56) References Cited

U.S. PATENT DOCUMENTS

| | | | |
|---|---|---|---|
| 4,903,335 A | | 2/1990 | Shimizu |
| 5,666,355 A | | 9/1997 | Huah et al. |
| 5,925,133 A | * | 7/1999 | Buxton et al. ............... 713/323 |
| 6,647,502 B1 | * | 11/2003 | Ohmori ....................... 713/322 |
| 6,691,071 B2 | * | 2/2004 | Kerr et al. ................... 702/188 |

FOREIGN PATENT DOCUMENTS

EP 0655872 5/1995

OTHER PUBLICATIONS

Gunn, James E. et al, "A Low–Power DSP Core–Based Software Radio Architecture," IEEE Journal on Selected Areas in Communications, IEEE Inc., New York, NY, vol. 17, No. 4, Apr. 1999, pp. 574–590, XP–000824304.

Abidi, A. et al, "The Future of CMOS Wireless Transceivers," Solid State Circuits Conference, 1997, Digest of Technical Papers, 43rd Isscc., 1997 IEEE International San Francisco, CA, Feb. 6–8, 1997, New York, NY, IEEE, Feb. 6, 1997, pp. 118–119, 440, XP010218943.

Subramanian R. et al, "Novel Application–Specific Signal Processing Architectures for Wideband CDMA and TDMA Applications," VTC 2000–Spring, 2000 IEEE 51st, Vehicular Technology Conference Proceedings, Tokyo, Japan, May 15–18, 2000, IEEE Vehicular Technology Conference, New York, NY, IEEE, vol. 2 of 3, conf. 51, May 15, 2000, pp. 1–8, XP002949185.

(List continued on next page.)

*Primary Examiner*—Young T. Tse
(74) *Attorney, Agent, or Firm*—Mattingly, Stanger & Malur, P.C.

(57) ABSTRACT

In order to effectively reduce power consumption of a terminal in a wireless communication apparatus upon packet communication, the wireless communication apparatus has a plurality of signal processing blocks having different signal processing periods; a buffer memory which links the signal processing blocks; and a clock control part which supplies or suspends a clock signal to each block. Each of the signal processing blocks watches whether or not there is data to be processed in the subsequent signal processing block. Based on the watched result, the clock control part controls an operation to supply or suspend the clock signal to the subsequent signal processing block.

8 Claims, 11 Drawing Sheets

OTHER PUBLICATIONS

Xia, F. et al, "Asnychronous Communiction Mechanisms Using Self–Timed Circuits," Advanced Research in Asynchronous Circuits and Systems, 2000, Proceedings, Sixth International Symposium on Eilat, Israel Apr. 2–6, 2000, Los Alamitos, CA, IEEE Comput, Soc., US, Apr. 2000, pp. 150–159, XP010377324.

"Nikkei Electronics, " published by Nikkei Business Publications, Inc., No. 732, pp. 183–193.

3GPP TSG RAN WGI TS25.214–v1.1.1; 3rd Generation Partnership Project; Technical Specification Group; Radio Access Network; Working Group 1; Physical Layer Procedures.

TSG RAN SWG1 TS25.211 (3rd Generation Partnership Project; Technical Specification Group; Radio Access Network; Working Group 1; Physical Channels and Mapping of Transport Channels onto Physical Channel).

* cited by examiner

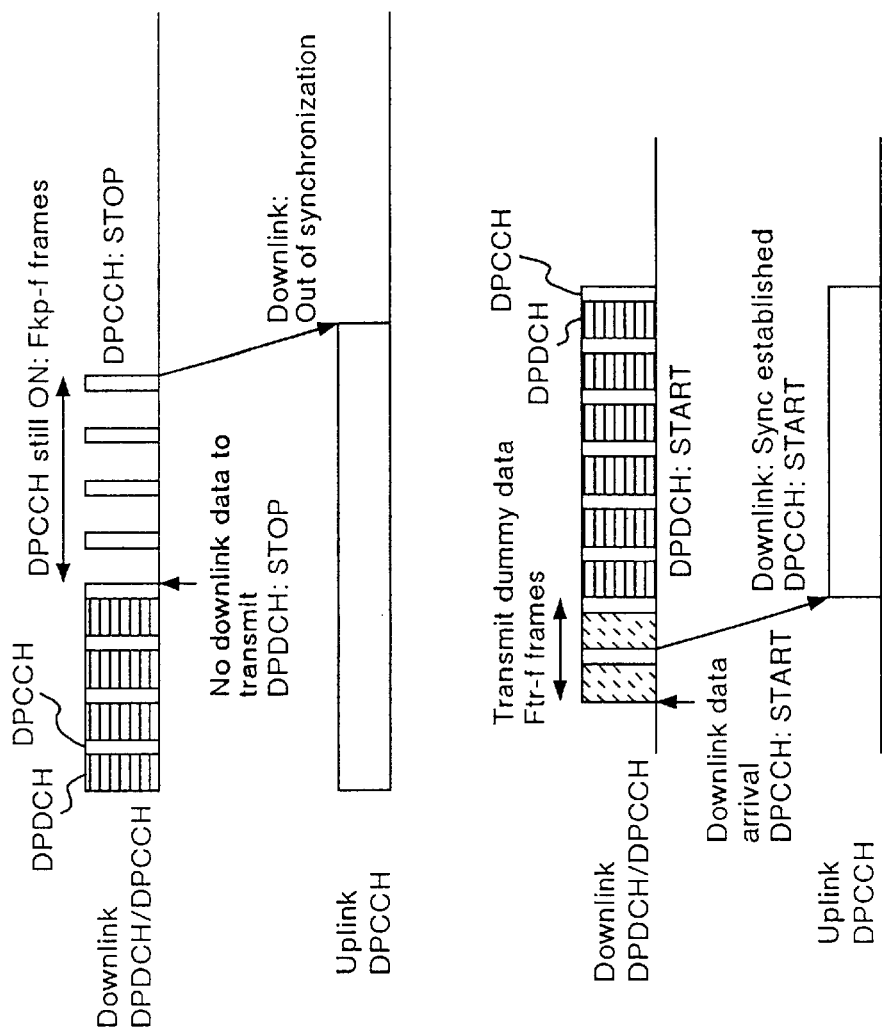

WIRELESS COMMUNICATION APPARATUS PROCESSING INTERMITTENT DATA

BACKGROUND OF THE INVENTION

1. Field of the Invention

The present invention relates to a wireless communication apparatus processing intermittent data, and more particularly, to the structure of a data processing part for processing a base band signal in a wireless communication apparatus for receiving/transmitting intermittent data such as packet data. In addition, the present invention is suitable to communication terminal equipment used for processing packet data which is used for a mobile communication system of a CDMA (Code Division Multiple Access) method, etc.

2. Description of the Related Art

In these days, a wireless communication apparatus for processing a signal mainly on software has been devised corresponding to the variation and complication of wireless communication methods. As a software receiver, a wireless communication apparatus shown in FIG. 11 is disclosed in, for example, a magazine of "Nikkei Electronics" published by Nikkei Business Publications, Inc., No. 732, pp.183–193. In this wireless communication apparatus, a received signal is converted into an intermediate frequency (IF) signal by a radio frequency (RF) circuit and, then, is inputted to a software receiver 39. The inputted IF signal is converted into a digital signal by an A/D converter 33, then, is quadrature-demodulated by a half-band filter (HBF) 34, and is converted into an I-signal and a Q-signal. The I- and Q-signals are stored in a memory 35.

Signal processing is subjected to the I- and Q-signals stored in the memory 35 on software by a digital signal processor (DSP) 36. The DSP 36 transmits the processed signal to a central processing unit (hereinlater, abbreviated to a CPU) 37 as received data. The CPU 37 performs processes for upper layers such as call control operation, and outputs the processed output to the outside via external interface. A clock generator 38 supplies a clock signal necessary for the above-described components.

Then, in accordance with the wide spread of data communication in mobile communication, the ratio of packet data services to conventional audio circuit switched services is rapidly increased, thus arising a problem to increase the power consumption of a terminal. That is, communication data rate required for data communication is ten times or more as high as the communication data rate required for the audio communication. Also, in accordance therewith, the amount of processed signals increases and the power consumption of terminal equipment is marked.

However, the communication is not always performed in the packet data communication, and it is known that the period in which no packet data is received/transmitted is long.

For example, in an IMT-2000 mobile communication system, TSG RAN SWG1 TS25.211 (3rd Generation Partnership Project; Technical Specification Group Radio Access Network; Physical channels and mapping of transport channels onto physical channels (FDD) (3G TS TS25.211 version 2.2.1) prescribes that a down signal to be transmitted to a terminal from a base station is communicated with a frame structure shown in FIGS. 9A to 9C. As shown in FIG. 9C, the signal is structured by sequentially linking frames. As shown in FIG. 9B, one frame comprises fifteen slots. Further, as shown in FIG. 9A, one slot comprises a DPCCH data portion having control data (Pilot, TFCI, and TPC) and a DPDCH data portion in which user data (Data1 and Data2) is stored. Herein, the user data is transmitted only when the packet exists, and in cases except therefor, the transmission of the user data suspends. According to 3GPP TSG_RAN_WG1 TS25.214-v1.1.1, as shown in FIG. 10, if there is no downlink transmitting data to a terminal from a base station, the transmission of the DPDCH data portion suspends and only the DPCCH data portion is transmitted.

Moreover, unless the downlink transmitting data is generated for a predetermined period, the transmission of the DPCCH data portion suspends. On the other hand, if the downlink transmitting data is generated during the suspension of transmission of down data, the base station starts the transmission of the DPCCH data portion and the transmission of dummy DPDCH data portion, and the transmission of downlink DPDCH data portion in which the user data is stored resumes.

As mentioned above, the transmission and suspension of the user data are repeated in the packet data communication and, therefore, it is considered that the amount of processed signals to be averagely obtained is relatively small. However, the DSP in the conventional wireless communication apparatus needs to always supply a clock signal corresponding to a communication signal process at the maximum communication data rate and the power consumption cannot be effectively reduced if the amount of processed signals decreases.

SUMMARY OF THE INVENTION

Accordingly, it is an object of the present invention to provide a wireless communication apparatus for performing intermittent communication such as packet data communication, capable of effectively reducing the power consumption corresponding to the decrease in amount of processed signals for a period in which there is no user data.

In order to accomplish the above object, according to the present invention, there is provided a wireless communication apparatus having a wireless processing part for processing a wireless signal including intermittent data such as packet data and a data processing part for receiving/transmitting the intermittent data to/from the wireless processing part, wherein the data processing part includes a plurality of signal processing blocks whose signal processing periods are different such as a symbol, slot, and frame of signal processing units, a buffer memory which is provided between the plurality of signal processing blocks, a clock control part which supplies a clock signal to each of the plurality of signal processing blocks and the buffer memory, and a power source control part which supplies a power source to each of the plurality of signal processing blocks and the buffer memory. At least one of the plurality of signal processing blocks has means for watching which watches whether or not there is data to be processed in the subsequent signal processing block having a different processing period. The clock control part has means for controlling an operation to supply or suspend the clock signal to the subsequent signal processing block based on the watched result of the means for watching.

Also, in order to accomplish the above object, according to the present invention, the wireless communication apparatus further has means for controlling a power voltage to be supplied to the signal processing block and a memory block based on the watched result of the means for watching.

According to the present invention, by independently supplying the clock signals to a plurality of signal processing engines having different processing periods and independently controlling the power voltages, power consumption can be effectively reduced in an intermittent transmitting sequence of packet data because powers of an operating signal processing circuit and a memory can be decreased.

The features and advantages of the above description and those other than the above description according to the present invention will be further described in detail in the following embodiment.

BRIEF DESCRIPTION OF THE DRAWINGS

FIG. 10 is a diagram of the sequence of suspension and resumption of transmission of packet data in the IMT-2000 mobile communication system.

DETAILED DESCRIPTION OF THE PREFERRED EMBODIMENTS

Figure 1:
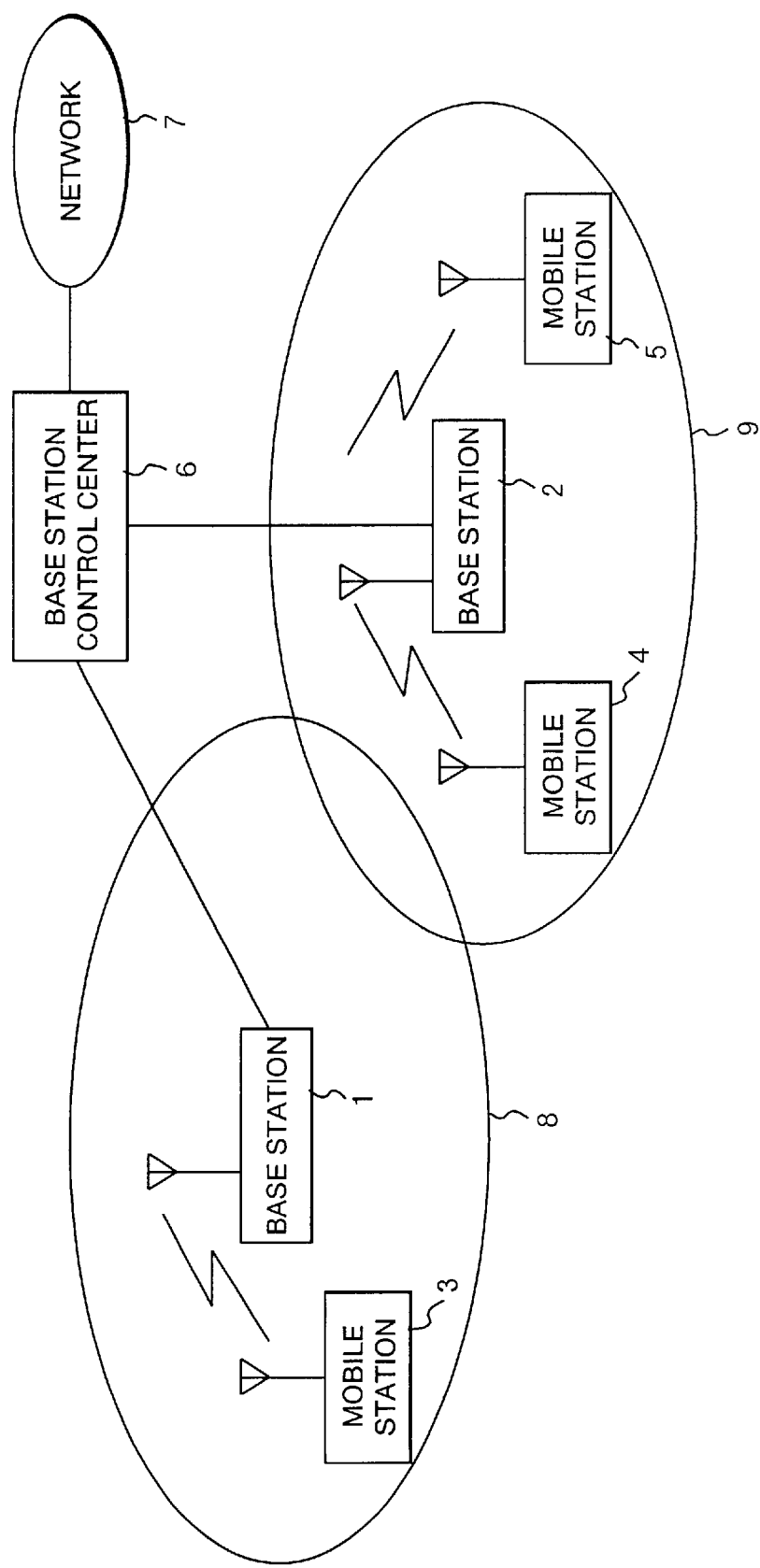
FIG. 1 is a diagram of the construction of a communication system using a wireless communication apparatus of the present invention.

FIG. 1 shows the construction of a mobile communication system in which a wireless communication apparatus of the present invention is used. A plurality of base stations 1 and 2 perform wireless communication among a plurality of wireless communication apparatuses (mobile terminals) 3, 4, and 5. The base stations 1 and 2 are connected to a network 7 via a base station control center 6. The base stations 1 and 2 have predetermined communicable areas 8 and 9, thus performing communication with the mobile terminals 3 and 4 in the areas 8 and 9, respectively.

Figure 2:
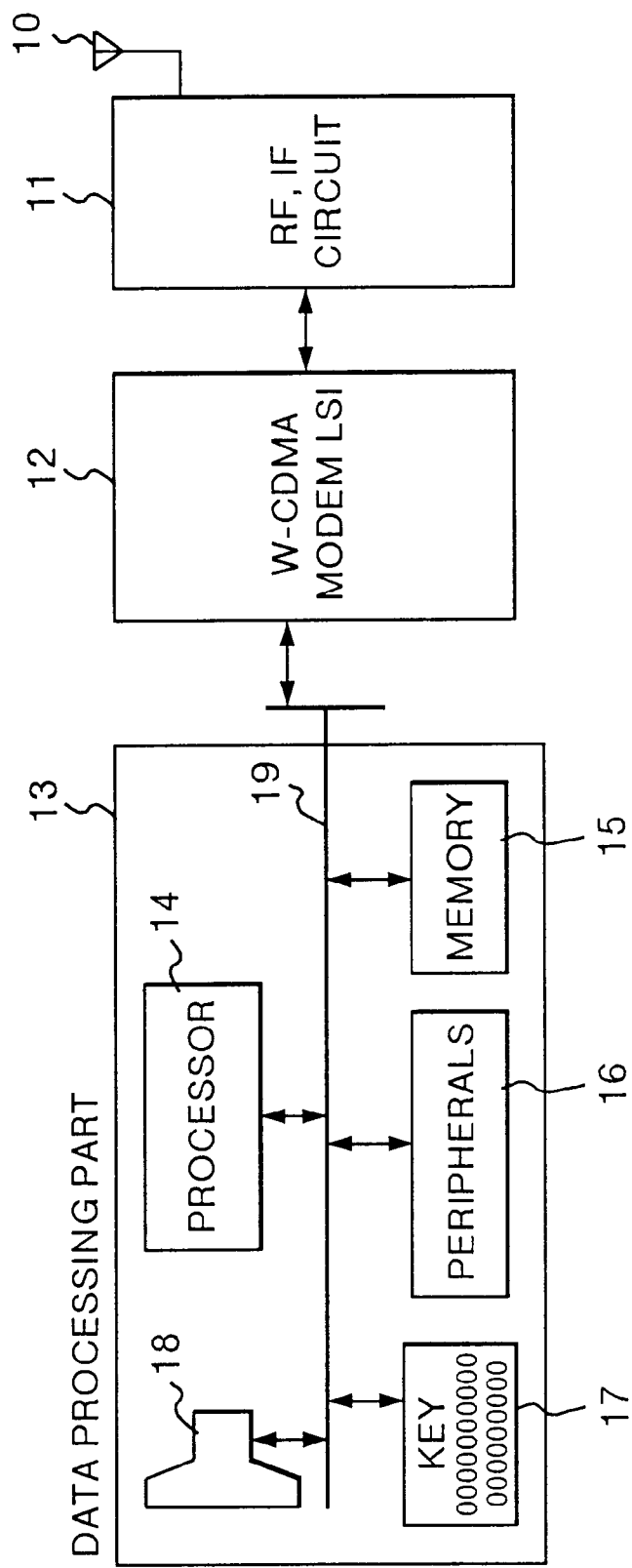
FIG. 2 is a diagram of the construction of a wireless communication apparatus according to one embodiment of the present invention.

FIG. 2 shows one construction of the mobile terminals 3, 4, and 5, etc. Each of the mobile terminals 3, 4, and 5 has an antenna 10 which receives/transmits a wireless signal between the base stations 1 and 2 and the mobile terminals 3, 4, and 5, a base band signal processing part 12 which is connected to the antenna 10 via a radio frequency circuit 11, and a data processing part 13 which is connected to the base band signal processing part 12 and processes user data.

The base band signal processing part 12 demodulates a received signal to be supplied from the radio frequency circuit 11, decodes it, and transmits it to the data processing part 13 for processing the user data. Transmitting data from the data processing part 13 is encoded, is subjected to a modulation, and is supplied to the radio frequency circuit 11.

The data processing part 13 comprises a processor 14, a memory 15, various peripherals 16, a display device 18, and a key pad 17, etc., which are connected via a bus line 19, and also performs conversion between a signal received/transmitted in a wireless manner and a signal to be received/transmitted to/from a user, etc.

Figure 3:
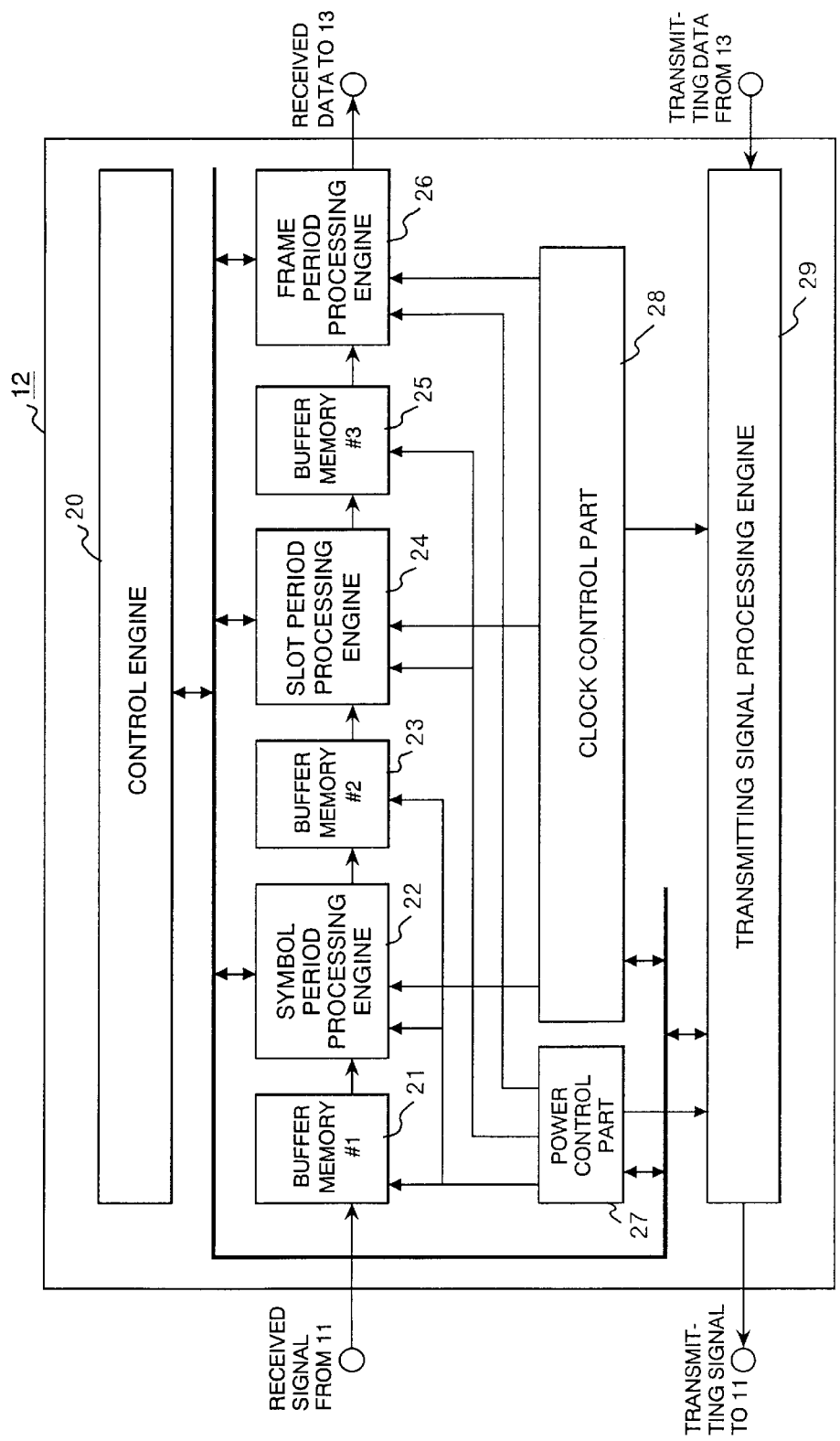
FIG. 3 is a diagram of a base band signal processing part in the wireless communication apparatus according to the embodiment of the present invention.

FIG. 3 shows the construction of the base band signal processing part 12 in the wireless communication apparatus according to one embodiment of the present invention. The present embodiment shows the base band signal processing part which processes the signal of the frame structure mentioned in FIGS. 9A to 9C, and the base band signal processing part 12 comprises one large scale integrated (LSI) circuit. The received base band signal which is supplied from the radio frequency circuit 11 is stored in a buffer memory 21. The received signal stored in the buffer memory 21 is subjected to a synchronizing process and a spectrum despreading process, etc. by a symbol period processing engine 22, thereby converting the signal into a signal based on a symbol unit. The signal based on the symbol unit is stored in a buffer memory 23.

Each time accumulating one slot of the signals based on the symbol unit to be stored in the buffer memory 23, a slot period processing engine 24 performs processes such as detection and Rake combining, and stores the signals in a buffer memory 25. Each time accumulating one frame of the signals in the buffer memory 25, a frame period processing engine 26 performs processes such as de-interleave and error correction, and outputs the signals as received data to the data processing part 13.

On the other hand, transmitting data to be supplied from the data processing part 13 is subjected to processes such as error correction encoding, interleave, modulation, spectrum spread by a transmitting signal processing engine 29, and the processed transmitting-signal is outputted to the radio frequency circuit 11.

The symbol period processing engine 22 and the slot period processing engine 24 as signal processing engines watch whether or not there is data to be processed by the slot period processing engine 24 and the frame period processing engine 26 as the individual subsequent signal processing engines. A control engine 20 controls operations of the symbol period processing engine 22, slot period processing engine 24, frame period processing engine 26, and transmitting signal processing engine 29 as the signal processing engines, thereby issuing an instruction to subsequently perform the above-mentioned signal processing.

Based on the watched result, the control engine 20 supplies a clock signal only for a period in which the symbol period processing engine 22, slot period processing engine 24, frame period processing engine 26, and transmitting signal processing engine 29 are to be operated. For a period except therefor, the control engine 20 controls a clock control part 28 to suspend the clock signal. Also, based on the watched result, the control engine 20 controls a power source control part 27 to reduce power consumption for a period in which the symbol period processing engine 22, slot period processing engine 24, frame period processing engine 26, and transmitting signal processing engine 29, and the buffer memories 21, 23, and 25 are not operated. To be specific, the control engine 20 decreases a power voltage for a period in which the operation is unnecessary and generates a specific bias voltage to diminish a leak current of the memory, etc.

Figure 4:
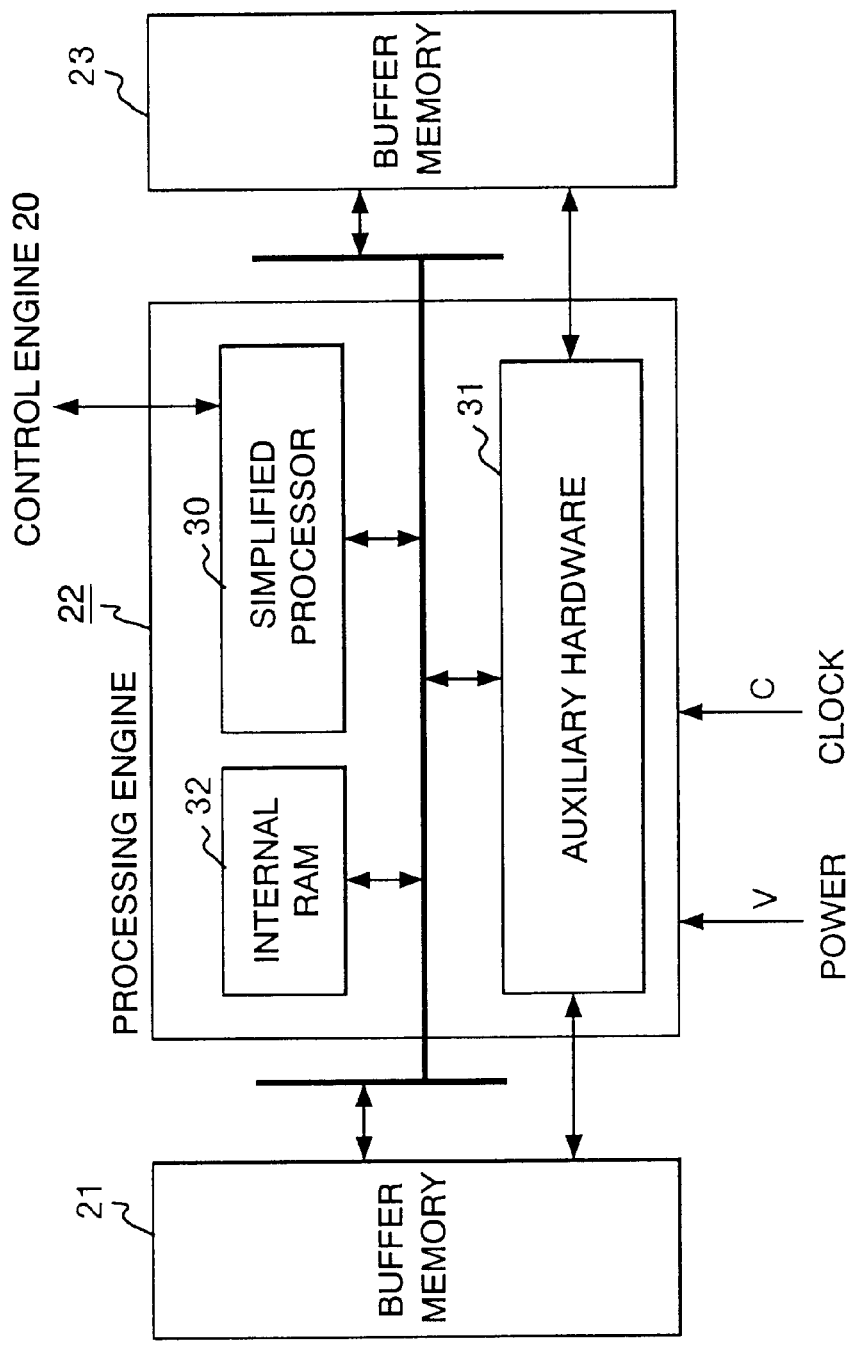
FIG. 4 is a diagram of the construction of a signal processing engine 22 in FIG. 3.

FIG. 4 shows the construction of the symbol period processing engine 22 as the signal processing engine. Although FIG. 4 also shows the construction of the symbol period processing engine 22 and the buffer memories 21 and 23 on the input/output side thereof, the same construction as the foregoing is applied to that of the slot period processing engine 24 and the buffer memories 23 and 24 on the input/output side thereof and that of the frame period processing engine 26 and the buffer memory 25 on the input side thereof.

The symbol period processing engine 22 as the signal processing engine reads out the signal stored in the buffer memory 21. The read-out signal is subjected to a signal process by a simplified processor 30 and an auxiliary hardware 31 for processing the read-out signal. The processed result is stored in the buffer memory 23. Also, the signal processing engine 22 has an internal memory (RAM) 32 which stores parameters, etc. necessary for temporary storage of the processed result and operations. The simplified processor 30 controls the operation with the symbol period processing engine 22 in accordance with an instruction of the control engine 20, executes a signal process necessary for the symbol period processing engine 22 in collaboration with the auxiliary hardware 31, and transmits various measured results, watched result, and operating processing state to the control engine 20.

Figure 5:
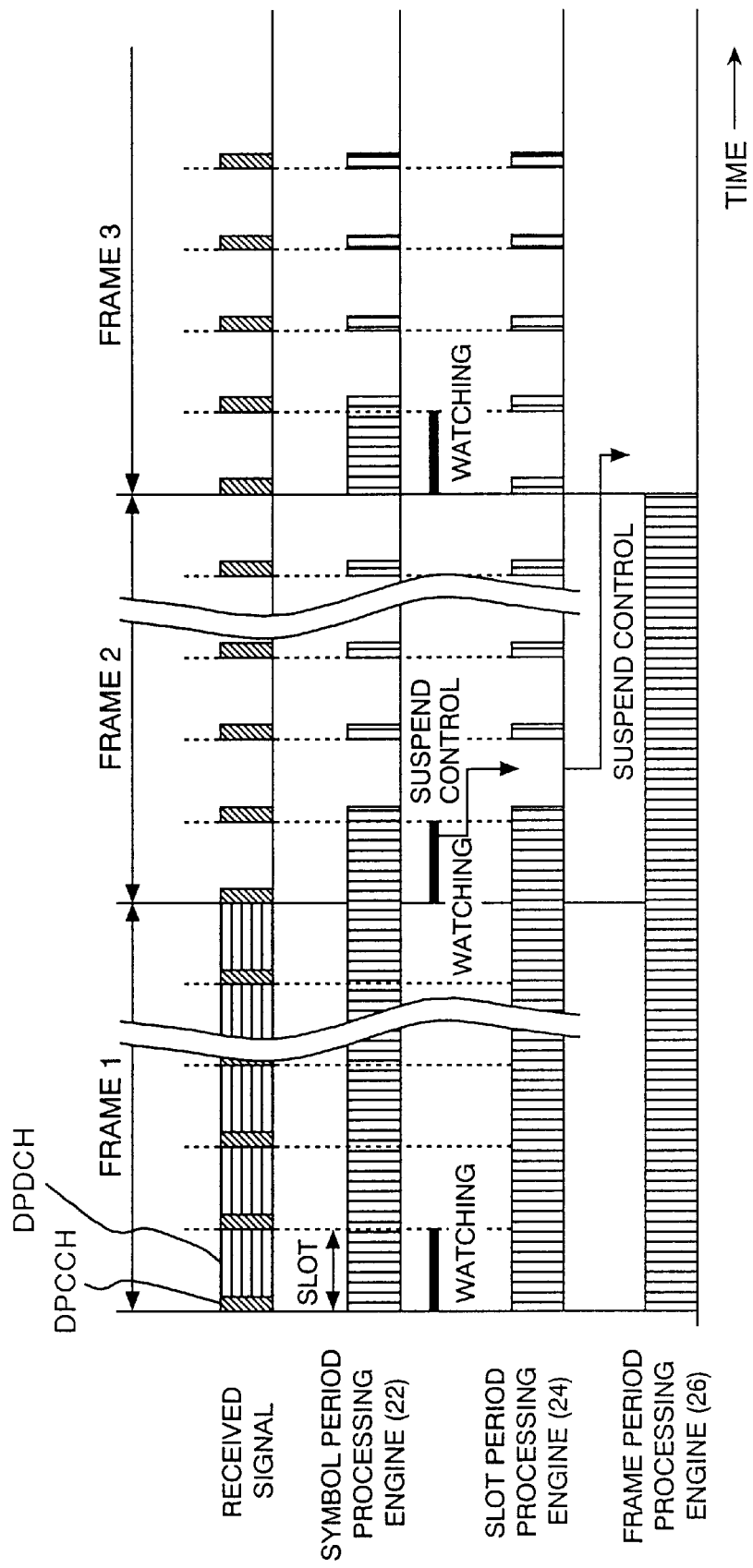
FIG. 5 is a time chart showing the operational sequence to suspend the transmission of a DPDCH data portion in the wireless communication apparatus according to the embodiment of the present invention.

FIG. 5 is a time chart showing an example of the operational sequence when no user data DPDCH is transmitted in the received signal in the wireless communication apparatus according to the embodiment of the present invention. Referring to FIG. 5, horizontal-line portions, oblique-line portions, and vertical-line portions indicate that there is valid data. In other words, FIG. 5 indicates that in the received signals, there is valid data in the user data DPCCH and DPDCH in a frame 1 and, on the contrary, there is valid data only in the user data DPCCH and no valid data in the user data DPDCH in frames 2 and 3.

When there are the user data DPCCH and user data DPDCH in the received signals as indicated in the frame 1, the symbol period processing engine 22, slot period processing engine 24, and frame period processing engine 26 continuously operate. In this case, the symbol period processing engine 22 watches whether or not there is valid data in the user data DPDCH in the received signals in the slot portion at the head of the frame.

When there is no user data DPDCH in the received signals in the slot portion at the head of the frame as indicated in the frame 2 and the symbol period processing engine 22 detects no user data DPDCH and the detected result is transmitted to the control engine 20, the control engine 20 controls the clock control part 28 and the power source control part 27 so that the symbol period processing engine 22 operates only during one slot period at the head of the frame and during reception of the DPCCH data. Also, the control engine 20 controls the operation so that the slot period processing engine 24 operates only during one slot period at the head of the frame and during reception of the DPCCH. Further, the control engine 20 controls an operation to suspend so that the frame period processing engine 26 is suspended after the frame process which is currently being processed is finished. Thereafter, the symbol period processing engine 22 intermittently continues a process of the DPCCH while watching the resumption of the DPDCH data portion or the suspension of the DPCCH data portion in the head slots of the subsequent frames to frame 3.

Figure 6:
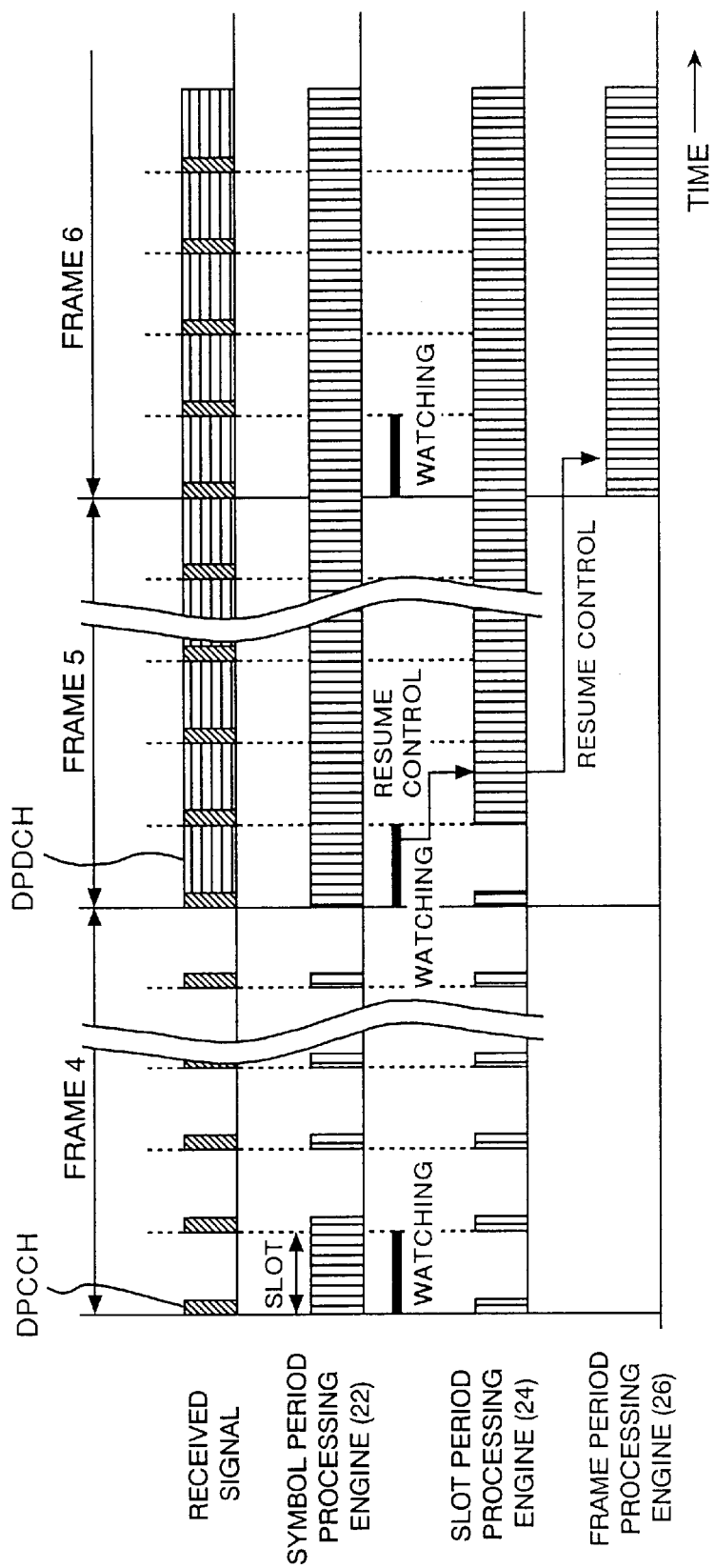
FIG. 6 is a time chart showing the operational sequence to resume the transmission of the DPDCH data portion in the wireless communication apparatus according to the embodiment of the present invention.

FIG. 6 is a time chart showing an example of the operational sequence in the case of change from a state in which there is only the DPCCH data portion in the received signals to the frame in which the DPDCH resumes in the wireless communication apparatus according to the embodiment of the present invention. The symbol period processing engine 22 watches the resumption of the DPDCH data portion and the suspension of the DPCCH data portion in the slot at the head of the frame while processing the DPCCH data portion in a period (frame 4) in which there is not DPDCH data portion. As the watched result, if the resumption of the DPDCH data portion is detected as indicated in a frame 5, the symbol period processing engine 22 transmits the watched result to the control engine 20. The control engine 20 controls the clock control part 28 and the power source control part 27 so that, subsequently thereto, the symbol period processing engine 22 and the slot period processing engine 24 operate continuously. Also, the control engine 20 controls the resumption of operation of the frame period processing engine 26 (frame 6), thus executing a decoding process of the resumed user data. Subsequently thereto, the symbol period processing engine 22, slot period processing engine 24, and frame period processing engine 26 as the signal processing engines operate continuously for a period in which there is DPDCH data portion in the slot at the head of the frame.

Figure 7:
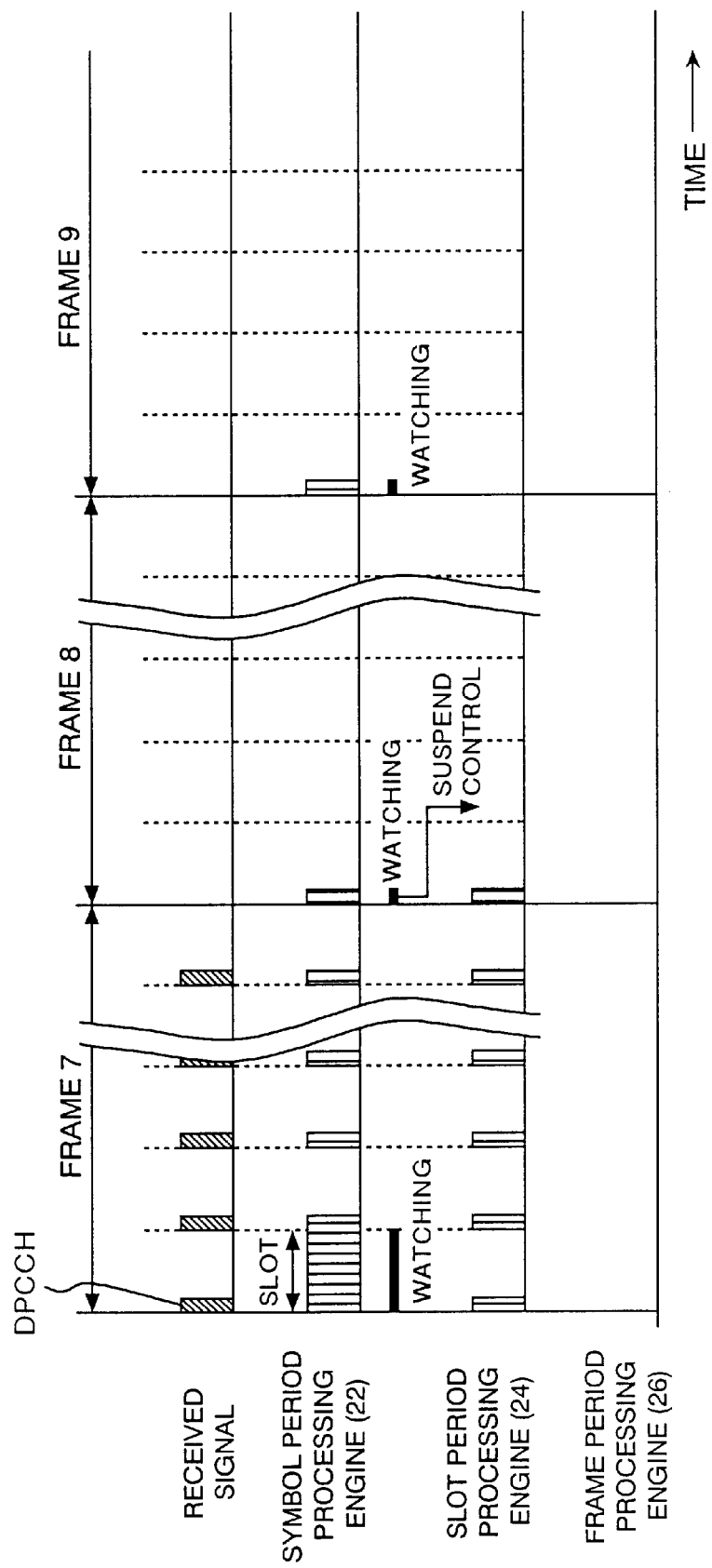
FIG. 7 is a time chart showing the operational sequence to suspend the transmission of a DPCCH data portion in the wireless communication apparatus according to the embodiment of the present invention.

FIG. 7 is a time chart showing an example of the operational sequence in the case of change from a state in which there is only the DPCCH data portion in the received signals to the frame in which the DPCCH suspends in the wireless communication apparatus according to the embodiment of the present invention. The symbol period processing engine 22 watches the resumption of the DPDCH data portion and the suspension of the DPCCH data portion in the slot at the head of the frame while intermittently executing a process for the DPCCH data portion. As the watched result, if the suspension (non-existence) of the DPCCH data portion is detected at the head of the frame as indicated in a frame 8, the symbol period processing engine 22 transmits the watched result to the control engine 20. The control engine 20 controls the clock control part 28 and the power source control part 27 based on the watched result so that, subsequently thereto, the symbol period processing engine 22 operates only during the period of the DPCCH data portion at the head of the frame and the slot period processing engine 24 suspends the operation subsequent to the next slot. After that, the symbol period processing engine 22 operates only for a period of the DPCCH data portion in the slot at the head of the frame and watches the resumption of the DPCCH data portion as indicated in a frame 9.

Figure 8:
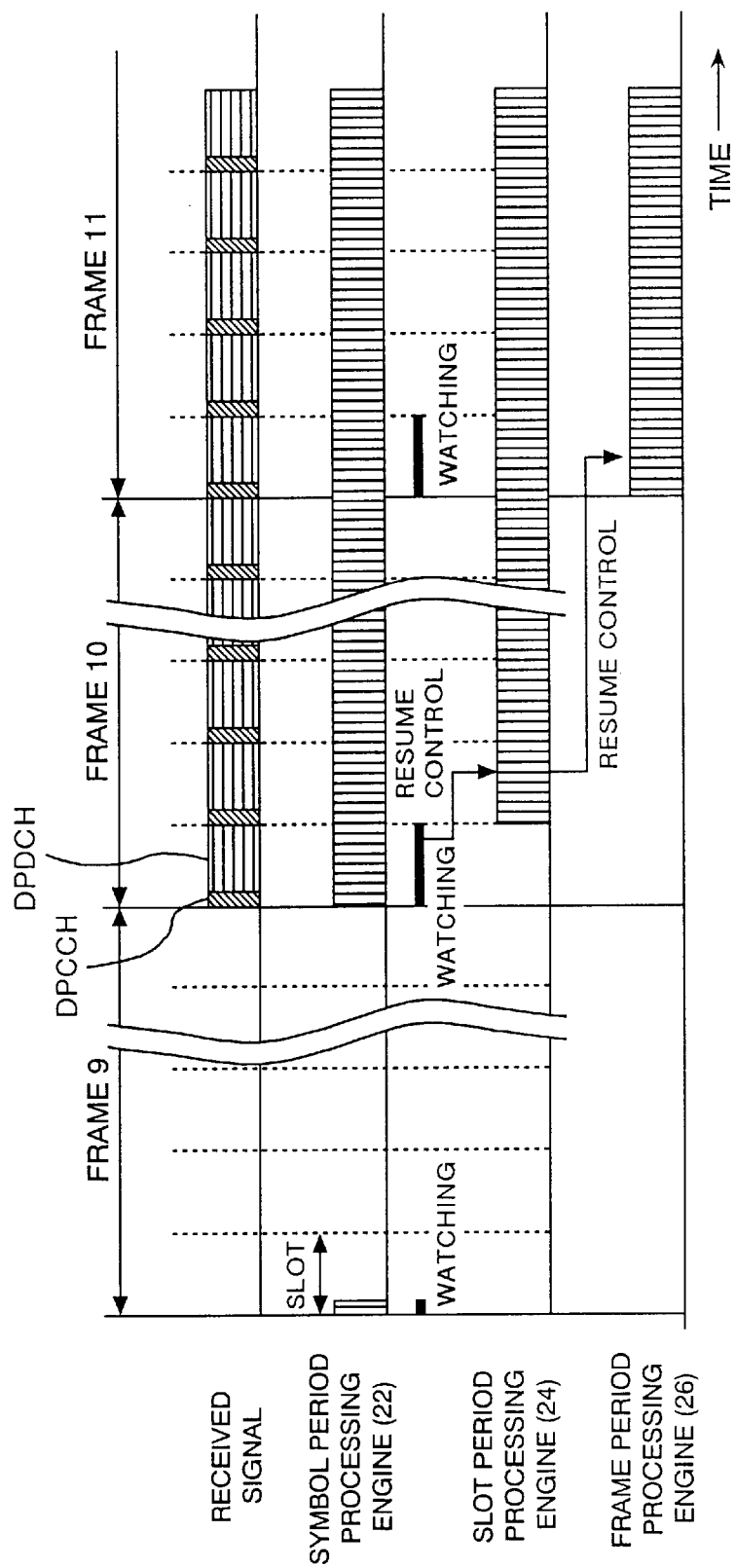
FIG. 8 is a time chart showing the operational sequence to resume the transmission of the DPCCH data portion and DPDCH data portion in the wireless communication apparatus according to the embodiment of the present invention.

FIG. 8 is a time chart showing an example of the operational sequence in the case of change from a state in which the received signal is completely suspended to a state in which the DPCCH and DPDCH data portions resume in the wireless communication apparatus according to the embodiment of the present invention. The symbol period processing engine 22 operates for the period of the DPCCH data portion in the slot at the head of the frame and watches the resumption of the DPCCH data portion. As the watched result, if the resumption of the DPCCH data portion is detected in the slot at the head of the frame as indicated in a frame 10, the control engine 20 controls the clock control part 28 and the power source control part 27 so that, subsequently thereto, the symbol period processing engine 22 operates for a period over the frame 10, the slot period processing engine 24 continuously operates for a period of slots subsequent to the second slot in the frame 10, and the frame period processing engine 26 continuously operates for a period of data subsequent to a frame 11. As mentioned above, a decoding process of the resumed user data is performed. After that, the symbol period processing engine 22, slot period processing engine 24, and frame period processing engine 26 continuously operate.

As described above, by controlling the independent operations for supplying the clock signal to the symbol period processing engine 22, slot period processing engine 24, and frame period processing engine 26 as the plural signal processing engines having different processing units and by controlling the power voltages of the symbol period processing engine 22, slot period processing engine 24, and frame period processing engine 26, the number of operating signal processing circuits can be minimized in the intermittent transmitting sequence of the packet data which is prescribed in FIG. 10, thereby effectively reducing power consumption.

Figures 9A, 9B, 9C:
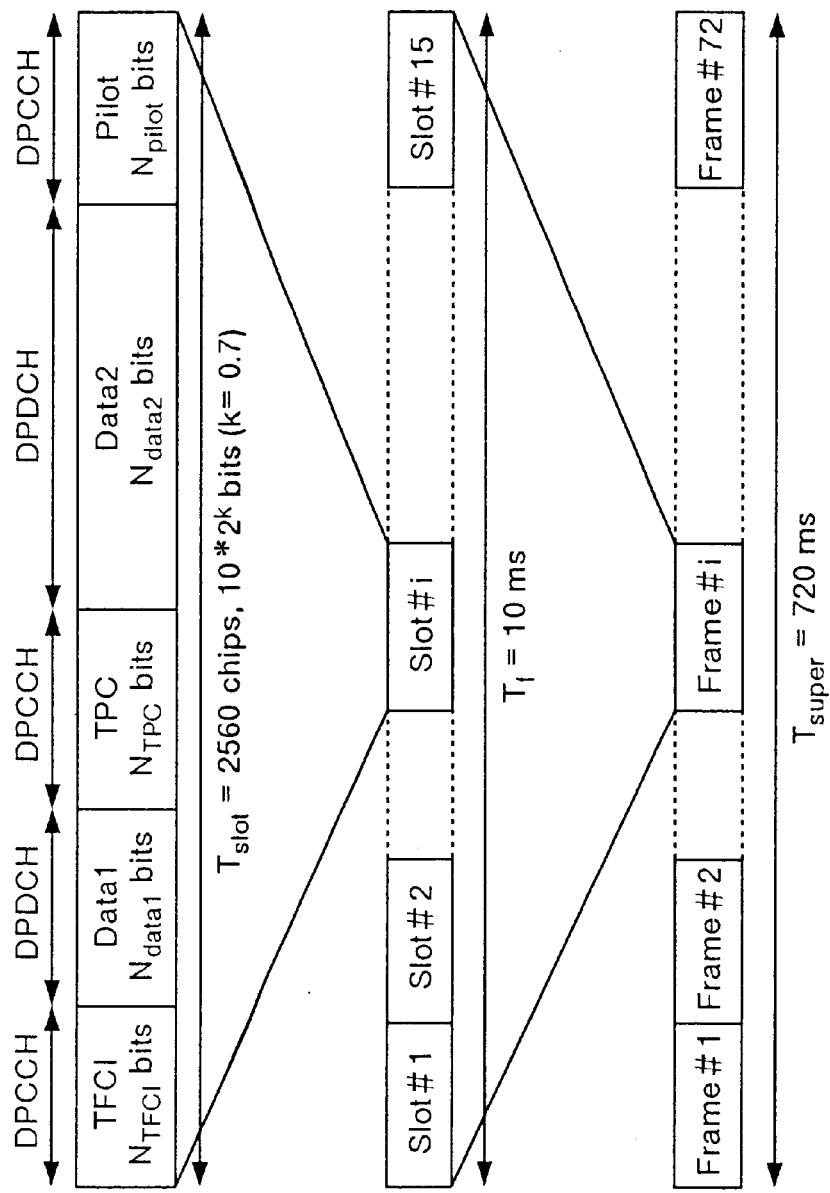
FIGS. 9A to 9C are diagrams of the construction of a frame in the IMT-2000 mobile communication system.
Figure 11:
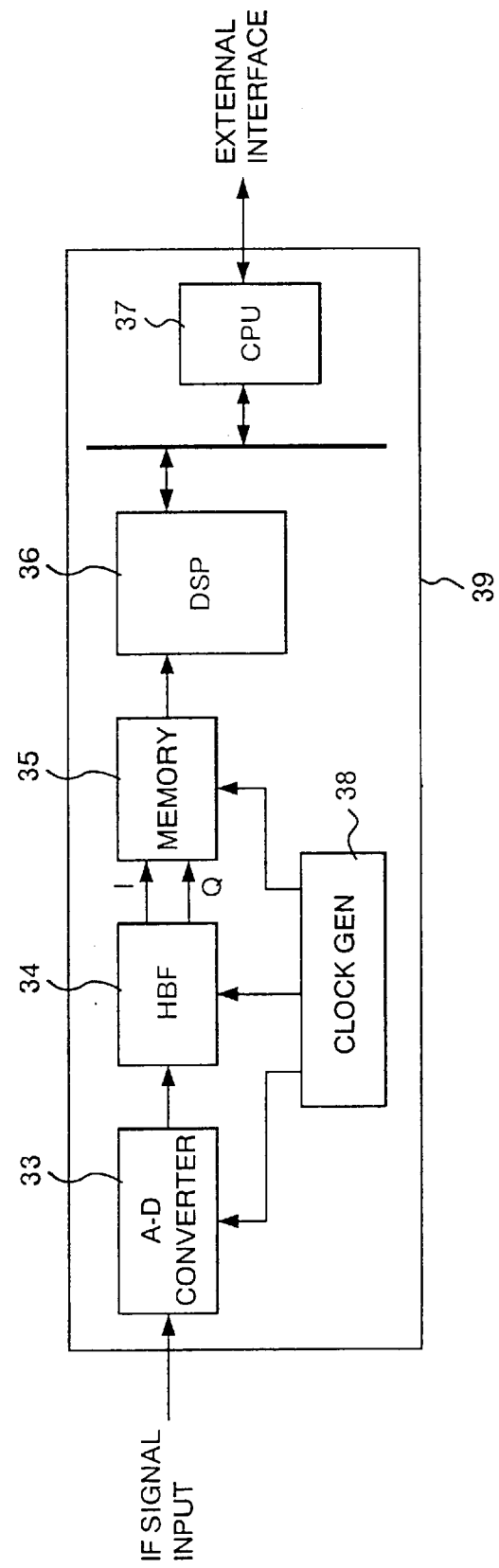
FIG. 11 is a diagram of the construction of a conventional wireless communication apparatus.

Although the example of the data of the frame structure shown in FIGS. 9A to 10 is described in the above embodiment, the present invention is not limited to the above embodiment and can be embodied to a wireless communication apparatus for intermittently communicating data. It is unnecessary to control clock signals and power sources of all plural signal processing blocks having different processing functions, and it is possible to control the clock signal and power source of the main signal processing block.

What is claimed is:

1. A wireless communication apparatus having a wireless processing part for processing a wireless signal including intermittent data and a base band signal processing part for receiving/transmitting said intermittent data to/from said wireless processing part, wherein said base band signal processing part comprises:

a plurality of signal processing blocks having different signal processing periods;

a buffer memory which is provided between said plurality of signal processing blocks;

a clock control part which supplies a clock signal to each of said plurality of signal processing blocks and said buffer memory;

a power source control part which supplies a power source to each of said plurality of signal processing parts and said buffer memory; and a control engine which controls said plurality of signal processing blocks, said buffer memory, said clock control part, and said power source control part, and at least one of said plurality of signal processing blocks has means for watching which watches whether or not there is data to be processed in the subsequent signal processing block having the different signal processing period, and said control engine also controls said clock control part to supply or suspend the clock signal to said subsequent signal processing block based on a watched result of said means for watching.

2. A wireless communication apparatus according to claim 1, wherein said control engine further controls said power source control part to supply the power source to be supplied to said subsequent signal processing block based on said watched result.

3. A wireless communication apparatus according to claim 1, wherein said intermittent data comprises a signal with a signal format including a periodic control data portion and a user data portion, and is a signal that a control signal is periodically transmitted when there is not said user data portion, and said at least one of signal processing blocks watches the existence of said user data portion and, when there is not said user data portion as the watched result, said control engine controls said clock control part to supply or suspend the clock signal to said at least one of signal processing blocks over a period in which said user data portion is to be processed.

4. A wireless communication apparatus according to claim 3, wherein said control engine further has means for controlling said power source control part to control the power source to be supplied to said subsequent signal processing block based on said watched result.

5. A wireless communication apparatus according to claim 1, wherein said intermittent data comprises a signal with a signal format including a periodic control data portion and a user data portion, is a signal that a control signal is periodically transmitted when there is not user data portion, and is a signal to suspend said periodic control data portion when there is not said user data portion sequentially a predetermined times or more, and said control engine controls said clock control part to supply or suspend the clock signal for a period in which the control signal is to be processed to at least one of said plurality of signal processing blocks based on said watched result.

6. A wireless communication apparatus according to claim 5, wherein said control engine further controls said power source part to control the power source to be supplied to said subsequent signal processing block based on said watched result.

7. A large scale integrated circuit comprising:

a plurality of signal processing blocks having different signal processing periods;

a buffer memory which is provided between said plurality of signal processing blocks;

a clock control part which supplies a clock signal to each of said plurality of signal processing blocks and said buffer memory;

a power source control part which supplies a power source to each of said plurality of signal processing blocks and said buffer memory; and a control engine which controls said plurality of signal processing blocks, said buffer memory, said clock control part, and said power source control part, wherein at least one of said plurality of signal processing blocks has means for watching which watches whether or not there is data to be processed in the subsequent signal processing block having the different processing period, and said control engine has means for controlling said clock control part to supply or suspend the clock signal to said subsequent signal processing block based on a watched result of said means for watching.

8. A large scale integrated circuit according to claim 7, wherein said plurality of signal processing blocks having the different signal processing periods has: a signal processing block which processes data based on a symbol unit; a signal processing block which processes data based on a slot unit; and a signal processing block which processes data based on a frame unit.

* * * * *